United States Patent
Wu (10) Patent No.: US 12,008,396 B2
(45) Date of Patent: Jun. 11, 2024

(54) APPLICATION STATE CONTROL METHOD APPARATUS, AND TERMINAL AND COMPUTER-READABLE STORAGE MEDIUM

(71) Applicant: ZTE Corporation, Shenzhen (CN)

(72) Inventor: Peng Wu, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 297 days.

(21) Appl. No.: 17/441,072

(22) PCT Filed: Apr. 10, 2020

(86) PCT No.: PCT/CN2020/084327
§ 371 (c)(1),
(2) Date: Sep. 20, 2021

(87) PCT Pub. No.: WO2020/224381
PCT Pub. Date: Nov. 12, 2020

(65) Prior Publication Data
US 2022/0179680 A1    Jun. 9, 2022

(30) Foreign Application Priority Data
May 6, 2019 (CN) .......................... 201910370183.9

(51) Int. Cl.
*G06F 9/46* (2006.01)
*G06F 9/445* (2018.01)
(Continued)

(52) U.S. Cl.
CPC .......... *G06F 9/485* (2013.01); *G06F 9/44505* (2013.01); *G06F 9/524* (2013.01); *G06F 9/526* (2013.01); *G06F 11/0757* (2013.01)

(58) Field of Classification Search
CPC .......... G06F 9/485; G06F 9/524; G06F 9/526; G06F 9/44505; G06F 11/0757
See application file for complete search history.

(56) References Cited

U.S. PATENT DOCUMENTS

2007/0011661 A1 *  1/2007  Itoh .......................... G06F 9/485
                                                                717/127
2013/0067475 A1    3/2013  Singh et al.
(Continued)

FOREIGN PATENT DOCUMENTS

CN    101645032 A  *  2/2010
CN    106200876 A     12/2016
(Continued)

OTHER PUBLICATIONS

Li et al., Process control method and electronic equipment, May 17, 2017, (Year: 2017).*
(Continued)

*Primary Examiner* — Emerson C Puente
*Assistant Examiner* — Zhi Chen
(74) *Attorney, Agent, or Firm* — Vivacqua Crane, PLLC (57) ABSTRACT

A method for controlling an application state, an apparatus, a terminal device and a non-transitory computer-readable storage medium are disclosed. The method may include: unfreezing a target application currently to be called in response to a determination that the target application is in a frozen state and a current call meets an application unfreezing trigger condition.

10 Claims, 5 Drawing Sheets

(51) Int. Cl.
  *G06F 9/48*  (2006.01)
  *G06F 9/52*  (2006.01)
  *G06F 11/07* (2006.01)

(56)                References Cited

U.S. PATENT DOCUMENTS

| 2014/0250293 | A1  |   | 9/2014 | Long et al. |            |
|--------------|-----|---|--------|-------------|------------|
| 2017/0116142 | A1  | * | 4/2017 | Abali       | G06F 3/0632 |
| 2017/0149864 | A1  | * | 5/2017 | Feiman      | H04L 67/10 |
| 2019/0179474 | A1  | * | 6/2019 | Lu          | G06F 3/03547 |
| 2022/0171448 | A1  | * | 6/2022 | Wu          | H04L 12/1886 |
| 2022/0197690 | A1  | * | 6/2022 | Zhang       | G06F 9/485 |

FOREIGN PATENT DOCUMENTS

| CN | 106681768 A |   | 5/2017 |             |
|----|-------------|---|--------|-------------|
| CN | 106844029 A |   | 6/2017 |             |
| CN | 106991003 A | * | 7/2017 | G06F 9/44594 |
| CN | 107066320 A | * | 8/2017 | G06F 9/485  |
| CN | 109144232 A |   | 1/2019 |             |
| CN | 109445917 A | * | 3/2019 | G06F 9/485  |
| CN | 109445917 A |   | 3/2019 |             |

OTHER PUBLICATIONS

International Searching Authority. International Search Report and Written Opinion for PCT Application No. PCT/CN2020/084327 and English translation, dated Jul. 7, 2020, pp. 1-10.
European Patent Office. Extended European Search Report for EP Application No. 20802456.2, dated May 13, 2022, pp. 1-9.

\* cited by examiner

APPLICATION STATE CONTROL METHOD APPARATUS, AND TERMINAL AND COMPUTER-READABLE STORAGE MEDIUM

CROSS-REFERENCE TO RELATED APPLICATION

This application is a national stage filing under 35 U.S.C. § 371 of international application number PCT/CN2020/084327, filed Apr. 10, 2020, which claims priority to Chinese patent application 201910370183.9 filed on May 6, 2019. The contents of these applications are incorporated herein by reference in their entirety.

TECHNICAL FIELD

Embodiments of the present disclosure relate to, but are not limited to, the field of terminal devices, in particular to, but not limited to, a method for controlling an application state, an apparatus, a terminal device and a non-transitory computer-readable storage medium.

BACKGROUND

Freezing technology is mainly a method based on intelligent terminal devices to restrict applications from occupying operating system resources. The freezing technology mainly includes prohibiting the occupation of Central Processing Unit (CPU) resources, and prohibiting the occupation of peripheral resources such as sensors, Global Positioning Systems (GPS) and memories. The freezing technology can effectively reduce power consumption and prolong battery life. The application of this freezing technology in intelligent terminal devices is particularly important when the energy consumption is still a shortcoming of various intelligent terminal devices. Process freezing is a better way to manage background behaviors. This process freezing can identify abnormal processes that are unnecessary for users, and then freeze these processes to limit their use of operating system resources and save power. When users reuse the application, they only need to schedule the application through the background of the terminal device. Through such freezing processing, the application does not need to be reopened and run, and the application loading time is saved.

After freezing the application on the terminal device, the application no longer consumes resources, but the application is still alive, and various business logic connections between the application and other modules in the operating system of the terminal device still exist normally. Although the frozen application will no longer actively make various logic calls, other applications or the operating system are likely to make logic calls to the frozen application in their respective logic flows. At present, in the existing technology, the frozen application does not respond to any call from other applications or the operating system, which can maximize the energy-saving effect achieved by such a freezing mechanism. However, the practice of not responding to any call may lead to serious blocking of the calling thread of the calling initiator. For example, if the operating system synchronously calls a frozen application and then synchronously waits for the frozen application to return a result, the calling thread of the operating system will always be in a blocking waiting state. If this call happens to be a very important operating system thread for the operating system and strict blocking monitoring is implemented, the exception handling module of the operating system will cause the operating system to restart after detecting the blocking, which will seriously affect the user experience.

SUMMARY

Embodiments of the present disclosure provide a method for controlling an application state, an apparatus, a terminal device and a non-transitory computer-readable storage medium.

An embodiment according to the present disclosure provides a method for controlling an application state, which may include: unfreezing a target application currently to be called in response to a determination that the target application is in a frozen state and a current call meets an application unfreezing trigger condition.

An embodiment according to the present disclosure provides an apparatus for controlling an application state, which may include: a control module configured to unfreeze a target application currently to be called in response to a determination that the target application is in a frozen state and a current call meets an application unfreezing trigger condition.

An embodiment according to the present disclosure provides a terminal device, which may include: a processor; a memory storing a computer program; and a communication bus configured to connect the processor and the memory; where the computer program, when executed by the processor, causes the processor to perform the steps of the above method for controlling an application state.

An embodiment according to the present disclosure provides a non-transitory computer-readable storage medium storing one or more computer programs which, when executed by one or more processors, cause the one or more processors to perform steps of the above method for controlling an application state.

Other feature and corresponding beneficial effect of the present disclosure are set forth below, and it should be understood that at least part of the beneficial effects will become apparent from the description in the present disclosure.

BRIEF DESCRIPTION OF DRAWINGS

FIG. 4-1 is a structural diagram of an apparatus for controlling an application state according to an example embodiment three of the present disclosure;

FIG. 4-2 is a schematic diagram of controlling an application state of the apparatus for controlling an application state according to the example embodiment three of the present disclosure;

DETAILED DESCRIPTION

In order to make the purposes, technical schemes and advantages of the present disclosure clear, the embodiments of the present disclosure will be further described in detail through specific implementations with reference to accompanying drawings. It should be understood that the specific embodiments described herein are only used to explain the disclosure, and are not used to limit the disclosure.

It can be understood by those having ordinary skills in the art that in the following embodiments of the present disclosure, the terminal device can be a mobile phone, a tablet computer, a notebook computer, a palmtop computer, a smart TV, a mobile internet device, a wearable device, or other terminal devices that can install an application/client application, or any other terminal devices or devices that can realize the application processing method of the present disclosure, which is not limited by the present disclosure.

Example Embodiment One

Figure 1:
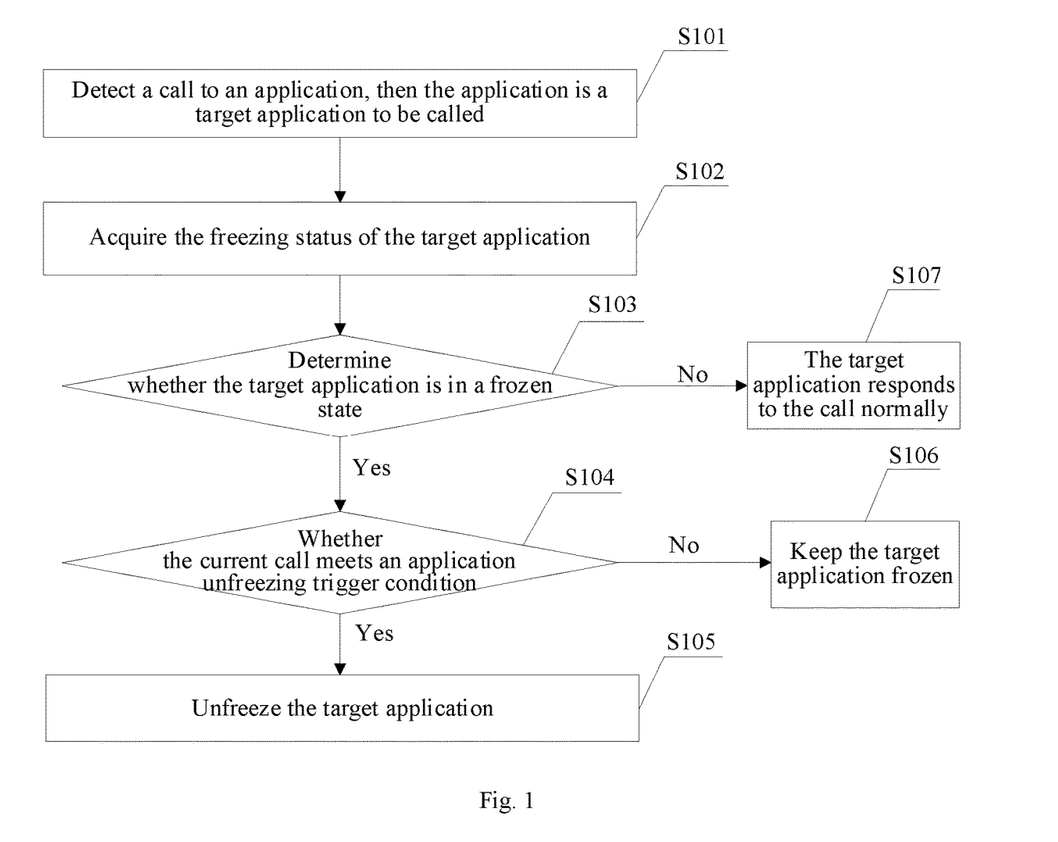
FIG. 1 is a flowchart of a method for controlling an application state according to an example embodiment one of the present disclosure.

In view of the unreasonable processing in the prior art, in which a frozen application does not respond to any call, this embodiment provides a method for controlling an application state. According to the method for controlling an application state, when a target application currently to be called is a frozen application, the target application is not directly unresponsive to any call, but unfrozen when it is determined that the current call meets an application unfreezing trigger condition, so that the unfrozen target application can normally respond to the call. Therefore, a situation that a call which needs to be responded by a frozen application can't be responded normally, which causes a serious blocking and then leads to an abnormal condition of the operation system, can be avoided as much as possible, so as to balance the energy saving of the terminal device and the call response processing. For convenience of understanding, this embodiment will be described below with reference to an exemplary method flow for controlling an application state shown in FIG. 1. Referring to FIG. 1, the method includes the following steps.

In a step of S101, a call for an application is detected, and the application is determined to be a target application to be called.

In this embodiment, the call for an application may include at least one of a call initiated by a logic flow of the operating system of the terminal device or a call initiated by other applications on the terminal device.

In a step of S102, a freezing status of the target application is acquired.

In this embodiment, the way to know whether an application is in a frozen state can be flexibly set. In an example, the freezing status of the application can be acquired through various modules at a bottom layer that can acquire information of the freezing status of the application. For example, in an application scenario, the freezing status of the target application to be called can be acquired through but not limited to an inter-process communication driver module. In this embodiment, a bottom layer can be flexibly determined according to different operating systems operated by the terminal device. For example, for a terminal device running Android operating system, the bottom layer may be a Linux kernel layer, and the inter-process communication driver module can be but not limited to a Binder driver module. For another example, for a terminal device running IOS operating system, the bottom layer may be a core operating system layer (CoreOS layer), and the inter-process communication driver module may be various modules in the core operating system layer that implement an inter-process communication mechanism and can acquire the application freezing status in the operating system.

In another example, the freezing status of the application can also be acquired through a freezing service module in the operating system of the terminal device. The freezing service module in this embodiment can be various modules that manage the freezing of applications and acquire the freezing statuses of applications. The freezing service module can be set at a user layer in the operating system. In this embodiment, the user layer can be flexibly determined according to different operating systems operated by the terminal device. For example, for a terminal device running Android operating system, the user layer may be an application framework layer. For another example, for a terminal device running IOS operating system, the user layer may be a Core Services layer.

It should be understood that the terminal device in this embodiment is not limited to a terminal device running Android operating system or IOS operating system, but may also be terminal devices running other operating systems. For terminal devices running other operating systems, they can be analogized and will not be repeated here.

In a step of S103, it is determined whether the target application is in a frozen state; if the target application is in a frozen state, the method flow goes to step S104; otherwise, the method flow goes to step S107.

In a step of S104, it is determined whether the current call meets the application unfreezing trigger condition; if the current call meets the application unfreezing trigger condition, the method flow goes to step S105; otherwise, the method flow goes to step S106.

In this step, the purpose of setting an application unfreezing trigger condition is to temporarily unfreeze a frozen application, so as to maintain the correctness of application logic; and to reduce a number of temporary unfreezing as much as possible, so as to strike a balance between temporary unfreezing to keep the correctness of application logic and keeping a frozen state to reduce energy consumption. Therefore, in this embodiment, in order to achieve this purpose, the application unfreezing trigger conditions can be flexibly set. In an example of this embodiment, the application unfreezing trigger conditions may include but are not limited to at least one of the following.

A call type of the current call is a synchronous call.

A call type of the current call is an asynchronous call, and the call is in a white list of preset calls. In this embodiment, the call white list includes various calls that need to be responded, by which a target application corresponding to a respective call needs to be unfrozen from a frozen state. The call white list may include unique identification information that can uniquely identify various calls. The unique identification information of a current call can be matched with respective unique identification information in the call white list to determine whether the current call is in the call white list.

Figure 2:
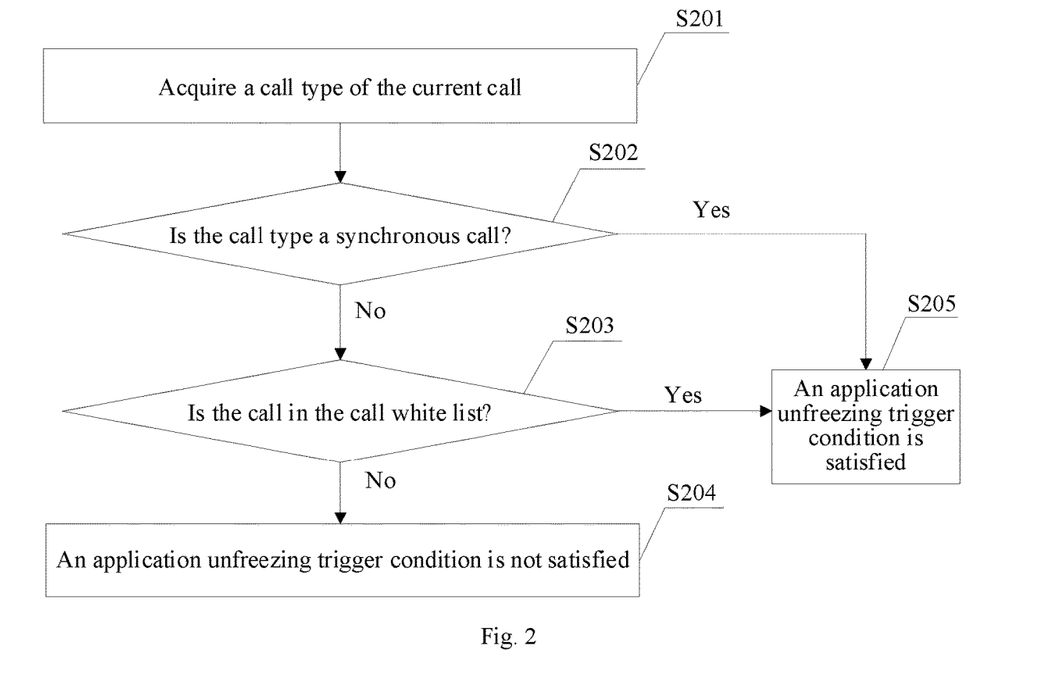
FIG. 2 is a schematic flow chart of determining trigger conditions for application unfreezing according to the example embodiment one of the present disclosure.

For example, in an application scenario of this embodiment, the application unfreezing trigger conditions include: a call type of the current call being a synchronous call; a call type of the current call being an asynchronous call, and the call being in a white list of preset calls. The process of determining whether the current call meets an application unfreezing trigger condition is shown in FIG. 2 and includes the following steps.

In a step of S201, a call type of the current call is acquired.

In a step of S202, it is determined whether the acquired call type is a synchronous call; if the acquired call type is not a synchronous call, the method flow goes to step S203; otherwise, the method flow goes to step S205.

In a step of S203, it is determined whether the current call is in a call white list; if the current call is in a call white list, the method flow goes to step S205; otherwise, the method flow goes to step S204.

In a step of S204, it is determined that the call does not meet the application unfreezing trigger condition.

In a step of S205, it is determined that the call satisfies the application unfreezing trigger condition.

In a step of S105, the target application is unfrozen.

In this embodiment, the unfrozen target application can normally respond to the call.

In this embodiment, methods for unfreezing the target application may include, but is not limited to, any of the following.

According to a first method, an unfreezing driver module is directly called by an inter-process communication driver module to unfreeze the target application. That is, the corresponding unfreezing driver module is directly called by the driver layer to unfreeze the target application.

According to the second method, the unfreezing driver module is directly called by a freezing service module to unfreeze the target application. That is, the corresponding unfreezing driver module can be called by the user layer to unfreeze the target application.

According to the third method, when it is determined that the current call corresponds to the first unfreezing type, the unfreezing driver module is called by the inter-process communication driver module to unfreeze the target application. When it is determined that the current call corresponds to the second unfreezing type, the unfreezing driver module is called by the freezing service module to unfreeze the target application.

In some examples, a first call list corresponding to the first unfreezing type may be set, and each call in the first call list corresponds to the first unfreezing type; otherwise, calls that do not belong to the first call list correspond to the second unfreezing type. Alternatively, in other examples, a second call list corresponding to the second unfreezing type may be set, and each call in the second call list corresponds to the second unfreezing type; otherwise, calls that do not belong to the second call list correspond to the first unfreezing type. Alternatively, a first call list corresponding to the first unfreezing type and a second call list corresponding to the second unfreezing type may be set, with calls belonging to the first call list corresponding to the first unfreezing type and calls belonging to the second call list corresponding to the second unfreezing type.

Moreover, it should be understood that in this embodiment, at least one of the call white list, the first call list and the second call list can be flexibly set and/or updated by at least one of a terminal device manufacturer, a service provider or a terminal device user, and each call in at least one of the above lists can be flexibly set. For example, it can be dynamically set and/or updated and maintained through at least one of Log analysis summary, Artificial intelligent (AI) based machine learning, or characteristics such as a calling criticality, a calling frequency, or a function realized via calling.

In an example of this embodiment, when the unfreezing driver module is called by the freezing service module to unfreeze the target application, it may include sending an unfreezing request message for requesting unfreezing the target application to the freezing service module by the inter-process communication driver module, so that the freezing service module can call the unfreezing driver module to unfreeze the target application according to the unfreezing request message.

Moreover, in order to ensure that the actual freezing state of the target application in the bottom layer is consistent with the freezing state of the target application in the freezing service module of the user layer, after unfreezing the target application, the freezing information can be synchronized, which may include but is not limited to updating the frozen state of the target application to the unfrozen state through the freezing service module.

In a step of S106, the target application is kept in a frozen state without responding to the call.

In a step of S107, the target application normally responds to the call.

Moreover, in this embodiment, in order to ensure the energy-saving effect of freezing the application, after the target application is temporarily unfrozen, it is also possible to monitor whether the conditions for re-freezing the target application are met, and if the conditions for re-freezing the target application are met, the target application is re-frozen, thus ensuring the energy-saving effect of freezing the application.

In this embodiment, the conditions for refreezing can be flexibly set, for example, including but not limited to at least one of the following:

monitoring an end of an execution of the current call;

a timer reaching a preset time threshold, where the timer starts counting after the target application is unfrozen, and the time threshold can be greater than or equal to the time required by the target application to respond to the call (i.e., execute a function corresponding to the call);

a reception of a refreezing instruction for the target application, where the re-freezing instruction can be issued by a user of the terminal device or automatically issued according to a preset condition.

In this embodiment, methods for refreezing the target application may include, but is not limited to, any of the following.

According to a first method, a freezing driver module is directly called by an inter-process communication driver module to freeze the target application. That is, the corresponding freezing driver module is directly called by the driver layer to freeze the target application.

According to the second method, the freezing driver module is directly called by a freezing service module to freeze the target application. That is, the corresponding freezing driver module can be called by the user layer to freeze the target application.

According to the third method, when it is determined that the current call corresponds to the first freezing type, the freezing driver module is called by the inter-process communication driver module to freeze the target application. When it is determined that the current call corresponds to the second freezing type, the freezing driver module is called by the freezing service module to freeze the target application.

In some examples, a third call list corresponding to the first freezing type may be set, and each call in the third call list corresponds to the first freezing type; otherwise, calls that do not belong to the third call list correspond to the second unfreezing type. Alternatively, in other examples, a fourth call list corresponding to the second freezing type may be set, and each call belonging to the fourth call list corresponds to the second freezing type; otherwise, calls that do not belong to the fourth call list correspond to the first unfreezing type. Alternatively, a third call list corresponding to the first freeze type and a fourth call list corresponding to the second freeze type may be set, with calls belonging to the third call list corresponding to the first freeze type and calls belonging to the fourth call list corresponding to the second freeze type. The third call list may be the same as or different from the first call list. The fourth call list may be the same as or different from the second call list.

In this embodiment, after refreezing the target application, the freezing information can be synchronized, which may include but is not limited to updating the unfrozen state of the target application to the frozen state through the freezing service module.

It can be seen that through the method for controlling an application state provided in this embodiment, when the target application in the frozen state needs to be called, the target application can be temporarily unfrozen to be able to normally respond to the call. When the target application in the frozen state does not need to be called, the target application will remain frozen without responding to the call, thus enabling the terminal device to reach a reasonable balance between energy saving by freezing an application and executing the call that needs to be responded normally, thus maintaining the normal execution of important services under the condition of reasonable energy saving of the terminal device, and thus improving the satisfaction of user experience.

Example Embodiment Two

For the convenience of understanding, this embodiment will be explained by taking a terminal device running Android operating system as an example. In this embodiment, a frozen application can be called by Binder. In this embodiment, efforts are made to temporarily unfreeze a frozen application that have been called by Binder with the least impact on a user. The goal is to minimize the occurrence of temporary unfreezing caused by unnecessary Binder calls, while keeping temporary unfreezing in response to necessary Binder calls to ensure the normal execution of the necessary Binder calls. Therefore, the frozen application can be kept in a reasonable frozen state as much as possible, saving energy and reduce consumption, and further improving the user experience.

In this embodiment, when the Binder call occurs, first, the freezing status of the target application called by the Binder is checked. If the target application is in a frozen state, it is further determined whether the Binder call meets an application unfreezing trigger condition. For example, the application unfreezing trigger conditions include: acquiring the call type of the Binder call, and determining that the target application needs to be unfrozen if the call type is a synchronous Binder call; if the call type is an asynchronous Binder call, a preset Binder call white list (which can also be called Binder call class table) needs to be further combined to determine whether the target application needs to be unfrozen, where the target application needs to unfreeze if the asynchronous Binder call is within the Binder call white list, otherwise, the target application will remain frozen, and the asynchronous Binder call will not be processed, thus reducing unnecessary unfreezing and energy consumption.

In this embodiment, before unfreezing the target application, it may be determined whether the unfreezing is performed by the Binder driver module (i.e., the inter-process communication driver module) or by the freezing service module of the user layer. If the target application is unfrozen by the Binder driver module, the unfrozen driver module can be called by the Binder driver module to unfreeze the target application, and a request for freezing data synchronization can be sent by the Binder driver module to the freezing service module. If the target application is unfrozen by the freezing service module, the Binder driver module can send an unfreezing request message and a request for freezing data synchronization to the freezing service module, and the Binder driver module can call the unfreezing driver module to unfreeze the target application according to the unfreezing request message. After the Binder driver module or freezing service module unfreezes the target application, the freezing service module updates the freezing status of the target application, that is, updates the freezing status from the frozen state to the unfrozen state, so as to ensure that the application freezing state in the freezing service module of the user layer is consistent with the actual application freezing state in the underlying driver layer. After temporary unfreezing is applied to the target application, the target application can be dynamically unfrozen when necessary.

Figure 3:
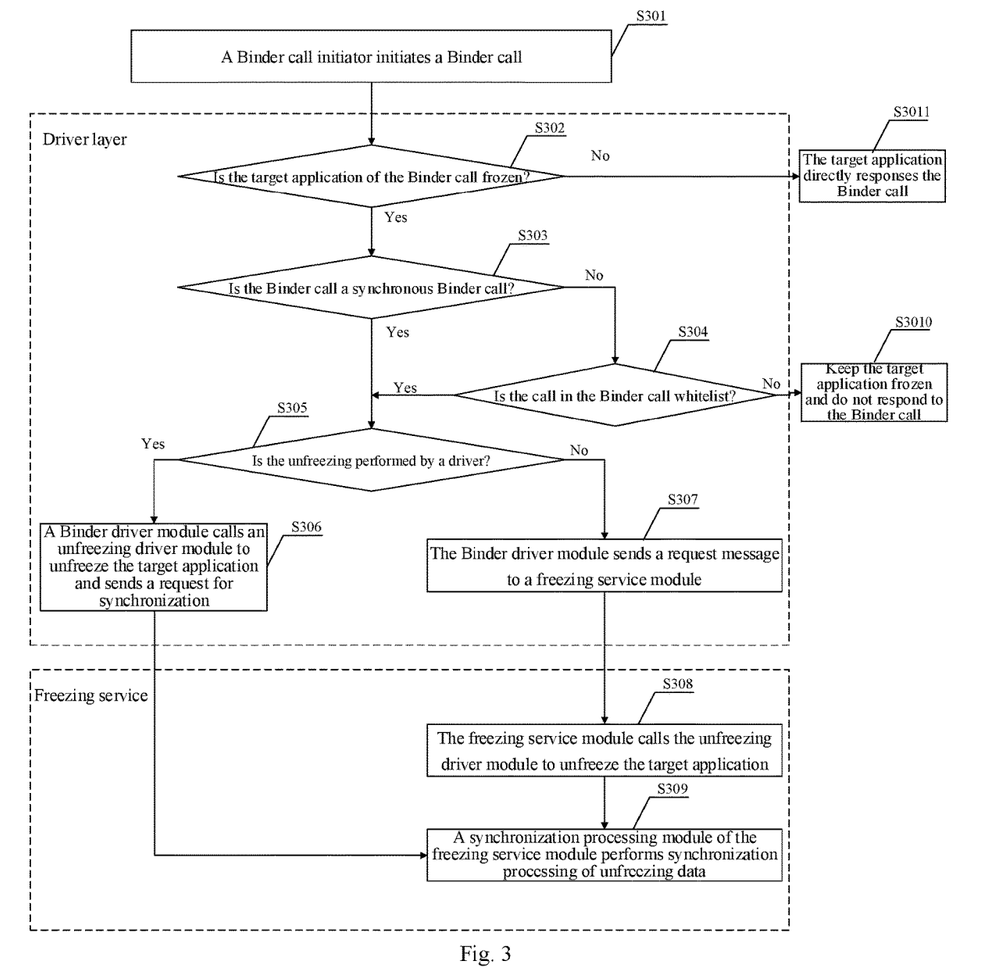
FIG. 3 is a schematic flow chart of a method for controlling an application state according to an example embodiment two of the present disclosure.

The above process for control an application state is shown in FIG. 3, and includes the following steps.

In a step of S301, a Binder call initiator initiates a Binder call; the Binder call is handled by the Binder driver module that enters the kernel through the system framework.

In a step of S302, in the Binder driver module, a freezing checkpoint checks the freezing status of a target application; if the target application is in a frozen state, the method flow goes to step S303; otherwise, the method flow goes to step S3011.

In a step of S303, in the Binder driver module, a Binder call type checkpoint determines whether the Binder call is a synchronous Binder call; if the Binder call is a synchronous Binder call, the method flow goes to step S305; otherwise, the method flow goes to step S304.

In a step of S304, it is determined whether the Binder call belongs to the Binder call white list; if the Binder call is in the Binder call white list, the method flow goes to step S305; otherwise, the method flow goes to step S3010.

In a step of S305, in the Binder driver module, the Binder call unfreezing mode checkpoint checks an unfreezing mode; if it is checked that the unfreezing mode is unfreezing through a driver, the method flow goes to step S306; otherwise, the method flow goes to step S307.

In a step of S306, the Binder driver module calls the unfreezing driver module to unfreeze the target application and send a request for synchronization.

In a step of S307, the Binder driver module sends a request message to the freezing service module, which may both request unfreezing and synchronization.

In a step of S308, the freezing service module calls the unfreezing driver module to unfreeze the target application.

In a step of S309, a synchronization processing module of the freezing service module performs synchronization processing of unfreezing data.

In a step of S3010, the target application remains frozen and does not respond to the Binder call.

In a step of S3011, the target application directly handles the Binder call normally.

It can be seen that the method for controlling an application state provided in this embodiment can set corresponding application unfreezing trigger conditions from multiple angles. Through this method, the frozen application can be unfrozen to respond to the call, with the least influence on the users. Through the method, the correctness of application functions and states can be guaranteed, and the occurrence of unnecessary temporary unfreezing in response to calls can be reduced, so that frozen applications can be kept in a frozen state as much as possible, saving energy and reducing consumption. Through the method, response can be performed normally upon necessary calls, further improving user experience.

Example Embodiment Three

Figure 41:
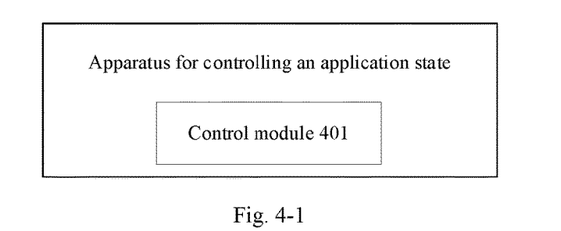

This embodiment provides an apparatus for controlling an application state, which can be installed in a terminal device. As shown in FIG. 4-1, the apparatus includes the following modules.

Figure 42:
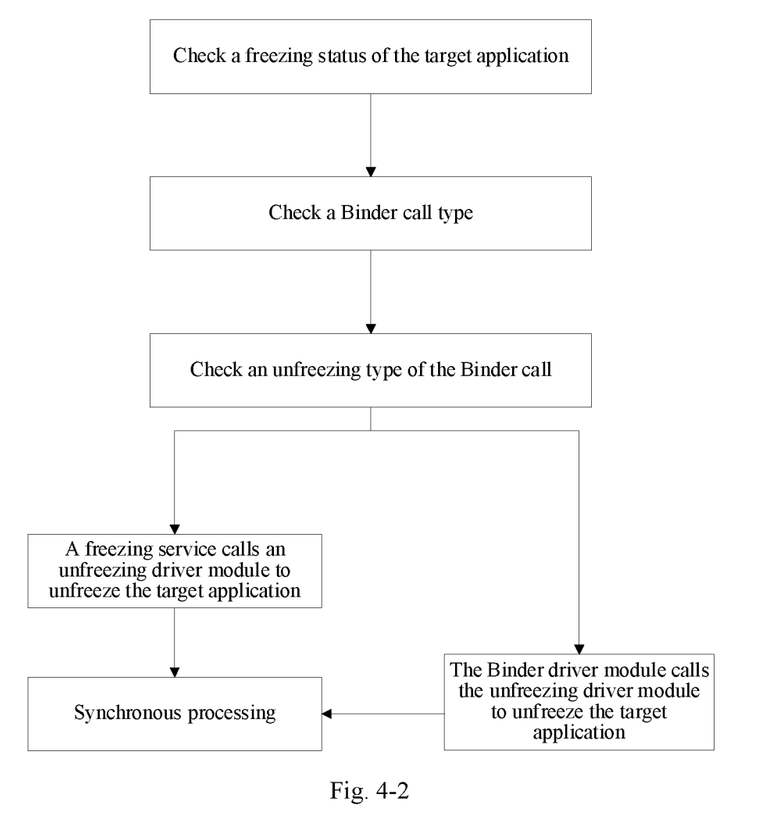

A control module 401 is provided, which is configured to unfreeze a target application currently to be called when determining that the target application is in a frozen state and a current call meets an application unfreezing trigger condition. The process of executing the above logic by the control module 401 in this embodiment may refer to the above embodiments. For convenience of understanding, this embodiment will be explained with the control logic of an application state in an Android operating system shown in FIG. 4-2 as an example.

After detecting a Binder call, the control module 401 may check the freezing status of an application through a freezing checkpoint in a Binder driver module to determine whether the target application called by the Binder is in a frozen state. If the target application is in a frozen state, a Binder call type checkpoint in the Binder driver module perform a further processing.

The Binder call type checkpoint is configured to check a call type of the Binder call, for example, to determine whether it is a synchronous call or an asynchronous call. If the Binder call is a synchronous call, the application is unfrozen. If the Binder call is an asynchronous call, it is decided whether to unfreeze the application according to a preset call white list. If the current asynchronous call belongs to the preset call white list, the application is unfrozen, otherwise, the application is not proceeded.

The Binder call unfreezing type checkpoint in the Binder driver module is configured to check an unfreezing type. According to a setting, the unfreezing type may include unfreezing through a driver, or sending a request to the freezing service module at the application framework layer to request unified unfreezing and synchronization operations.

The Binder driver module is configured to call the unfreezing driver module to unfreeze the target application, when it is determined to unfreeze through a driver.

The freezing service module is configured to call the unfreezing driver module to unfreeze the target application when it is determined to unfreeze through the freezing service in the application framework layer.

The synchronization processing module is configured to synchronize the frozen information of the target application to keep the actual freezing state of the application in the underlying driver layer consistent with the freezing state of each process in the freezing service module.

The unfreezing driver module is configured to perform unfreezing operation of the target application in response to the call of the Binder driver module or the call of the freezing service module.

The above description only takes an Android operating system as an example. For the control logic of an application state in an IOS operating system or other operating systems, it can be analogized and will not be described in detail here.

Example Embodiment Four

Figure 5:
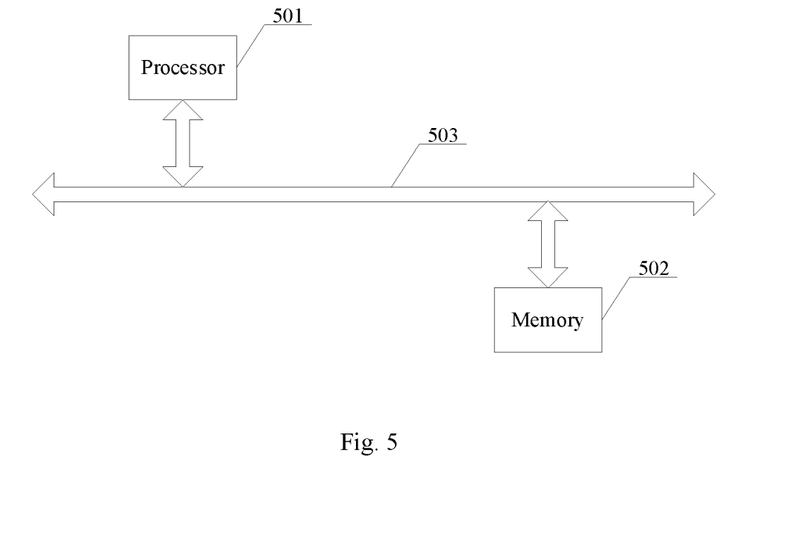
FIG. 5 is a schematic structural diagram of a terminal device according to an example embodiment four of the present disclosure.

This embodiment provides a terminal device, which may include various mobile terminal devices or non-mobile terminal devices. Referring to FIG. 5, the terminal device includes a processor 501, a memory 502 and a communication bus 503.

The communication bus 503 is configured to connect the processor 501 and the memory 502.

The processor 501 is configured to execute a computer program stored in the memory 502 to realize the steps of the method for controlling an application state as shown in the above embodiments. The memory 502 here may be a memory on the terminal device. The memory 502 may not include a memory provided on a terminal device component that can be separated from the terminal device. As required, the memory 502 may also include a memory provided on a terminal device component that can be separated from the terminal device.

Figure 6:
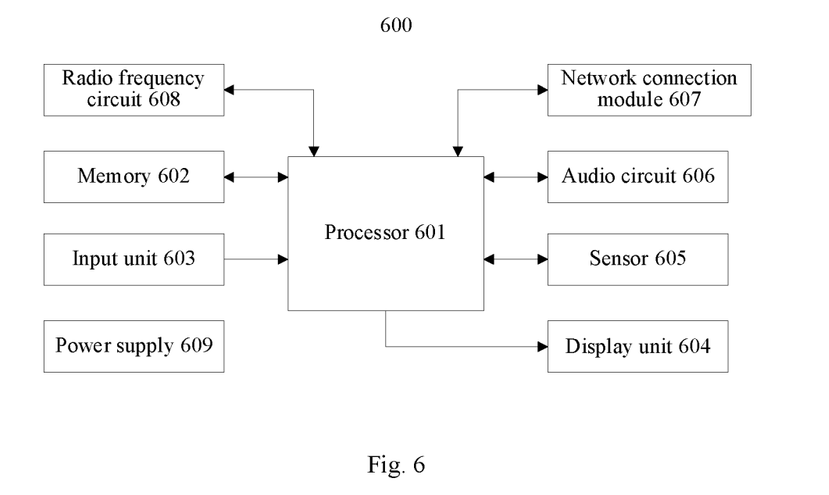
FIG. 6 is a schematic structural diagram of another terminal device according to the example embodiment four of the present disclosure.

In this embodiment, the terminal device shown in FIG. 5 may be a mobile phone, a tablet computer, a notebook computer, a palm computer, a smart TV, a mobile internet device, a wearable device, or other terminal devices that can install an application client, or any other terminal devices or devices that can realize the method for controlling an application state disclosed in the present disclosure. In this embodiment, a specific structure of a terminal device will be described as an example. In an embodiment of a terminal device 600 according to the present disclosure, the terminal device 600 includes a radio frequency circuit 608, a memory 602 of one or more non-transitory computer-readable storage medium, an input unit 603, a display unit 604, a sensor 605, an audio circuit 606, a network connection module 607 (e.g., a Wi-fi module), one or more processors 601, and a power supply 609, etc. Those having ordinary skills in the art can understand that the above structure does not constitute a limitation on the terminal device, and may include more or fewer components than those listed. The radio frequency circuit 608 may be configured to receive and send communication signals, receive information from a base station, and then forward them to the processor 601 for processing. The memory 602 is configured to store software programs (including but not limited to the above-mentioned computer programs, for example) and software modules. The processor 601 is configured to perform various functions and data processing by executing software programs or modules in the memory 602. The input unit 603 may be configured to receive input numeric or character information. The input unit 603 may include various input devices, such as a touch screen and other input devices. The input unit 603 is configured to convert all kinds of input information into computer instructions and send them to the processor 601, and may also receive commands from the processor 601 for execution. The display unit 604 is configured to display information input by the user or information provided by the terminal device to the user, and various graphical user interfaces on the terminal device. The terminal device 600 also includes at least one sensor, such as an optical sensor, a motion sensor, and the like. The terminal device 600 may also include an audio circuit 606, a network connection module 607, and a power supply 609, etc.

This embodiment also provides a non-transitory computer-readable storage medium including volatile or non-volatile, removable or non-removable media implemented in any method or technology for storing information, such as computer-readable instructions, data structures, computer program modules or other data. A computer-readable storage medium, includes but not limited to, random access memory (RAM), read-only memory (ROM), electrically erasable programmable read-only memory (EEPROM), flash memory or other memory technologies, compact disc read-only memory (CD-ROM), digital versatile disc (DVD) or other optical disc storage, magnetic box, magnetic tape, magnetic disc storage or other magnetic storage devices, or any other medium that can be used to store desired information and can be accessed by computers.

In an example, the computer-readable storage medium in this embodiment can be used to store one or more computer programs, which can be executed by one or more processors to perform the steps of the method for controlling an application state as shown in the above embodiments.

This embodiment also provides a computer program (or computer software), which can be distributed on a computer readable medium and executed by a computing device to perform at least one step of the method for controlling an application state as shown in the above embodiments. In some cases, at least one step shown or described may be performed in an order different from that described in the above embodiments.

This embodiment also provides a computer program product, including a computer-readable device storing the computer program as shown above. The computer-readable device in this embodiment may include the computer-readable storage medium as shown above.

It can be seen that those having ordinary skills in the art should understand that all or some steps in the method disclosed above, the operating system, and the functional modules/units in the device can be implemented as software (which can be implemented by computer program code executable by the computing device), firmware, hardware, and appropriate combinations thereof. In the hardware implementation, the division between functional modules/units mentioned in the above description does not necessarily correspond to the division of physical components. For example, one physical component may have multiple functions, or one function or step may be cooperatively performed by several physical components. Some or all of the physical components may be implemented as software executed by a processor, such as a central processing unit, a digital signal processor or a microprocessor, or as hardware, or as an integrated circuit, such as an application specific integrated circuit.

Furthermore, it is well known to those having ordinary skills in the art that communication media typically contain computer-readable instructions, data structures, computer program modules, or other data in a modulated data signal such as a carrier wave or other transmission mechanism, and may include any information delivery media. Therefore, the present disclosure is not limited to any particular combination of hardware and software.

The above is a detailed description of the implementations of the present disclosure combined with several embodiments, and it cannot be considered that the implementations of the present disclosure are only limited to these embodiments. For ordinary technicians in the technical field to which the present disclosure belongs, without departing from the concept of the present disclosure, several simple derivations or substitutions can be made, which should be regarded as belonging to the protection scope of the present disclosure.

The invention claimed is:

1. A method for controlling an application state, comprising:
    unfreezing a target application currently to be called in response to a determination that the target application is in a frozen state and a current call meets an application unfreezing trigger condition;
    wherein the method further comprising:
        before unfreezing the target application, sending an unfreezing request message for requesting unfreezing the target application to a freezing service module through an inter-process communication driver module, and calling an unfreezing driver module to unfreeze the target application according to the unfreezing request message from the freezing service module.

2. The method of claim 1, wherein the application unfreezing trigger condition comprises at least one of:
    a calling type of the current call is a synchronous call; or
    a calling type of the current call is an asynchronous call, and the current call is in a preset call white list.

3. The method of claim 1, after unfreezing the target application, further comprising:
    updating the frozen state of the target application to an unfrozen state through the freezing service module.

4. The method of claim 1, wherein determining whether the target application currently to be called is in a frozen state comprises:
    acquiring the freezing status of the target application currently to be called through the inter-process communication driver module.

5. The method of claim 1, after unfreezing the target application, further comprising:
    refreezing the target application in response to monitoring that a refreezing condition of the target application is triggered;
    wherein the refreezing condition includes at least one of:
    an end of an execution of the current call;
    a timer reaching a preset time threshold, wherein the timer starts counting after the target application is unfrozen; or
    a reception of a refreezing instruction for the target application.

6. The method of claim 2, after unfreezing the target application, further comprising:
    refreezing the target application in response to monitoring that a refreezing condition of the target application is triggered;
    wherein the refreezing condition includes at least one of:
    an end of an execution of the current call;
    a timer reaching a preset time threshold, wherein the timer starts counting after the target application is unfrozen; or
    a reception of a refreezing instruction for the target application.

7. The method of claim 3, after unfreezing the target application, further comprising:
    refreezing the target application in response to monitoring that a refreezing condition of the target application is triggered;
    wherein the refreezing condition includes at least one of:
    an end of an execution of the current call;
    a timer reaching a preset time threshold, wherein the timer starts counting after the target application is unfrozen; or
    a reception of a refreezing instruction for the target application.

8. An apparatus for controlling an application state, comprising:
a control module configured to unfreeze a target application currently to be called in response to a determination that the target application is in a frozen state and a current call meets an application unfreezing trigger condition;
wherein the control module comprises:
a freezing service module receives an unfreezing request message for requesting unfreezing the target application through an inter-process communication driver module, and
an unfreezing driver module unfreezes the target application according to the unfreezing request message in response to calling the unfreezing drive module from the freezing service module.

9. A terminal device comprising:
a processor;
a memory storing a computer program; and
a communication bus configured to connect the processor and the memory;
wherein the computer program, when executed by the processor, causes the processor to perform the step of a method comprising:
unfreezing a target application currently to be called in response to a determination that the target application is in a frozen state and a current call meets an application unfreezing trigger condition;
before unfreezing the target application, sending an unfreezing request message for requesting unfreezing the target application to a freezing service module through an inter-process communication driver module, and calling an unfreezing driver module to unfreeze the target application according to the unfreezing request message from the freezing service module.

10. A non-transitory computer-readable storage medium storing one or more computer programs which, when executed by one or more processors, cause the one or more processors to perform steps of the method for controlling an application state of claim 1.

* * * * *